United States Patent
Lin

(10) Patent No.: US 10,776,260 B1
(45) Date of Patent: Sep. 15, 2020

(54) CO-OPERATIVE MEMORY MANAGEMENT SYSTEM

(71) Applicant: Kinaxis Inc., Ottawa, Ontario (CA)

(72) Inventor: Angela Lin, Kanata (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 16/412,668

(22) Filed: May 15, 2019

(51) Int. Cl.
  *G06F 12/02* (2006.01)
  *G06F 9/50* (2006.01)

(52) U.S. Cl.
  CPC ........ *G06F 12/0238* (2013.01); *G06F 9/5016* (2013.01); *G06F 9/5083* (2013.01)

(58) Field of Classification Search
  CPC .................................................... G06F 9/5016
  See application file for complete search history.

(56) References Cited

U.S. PATENT DOCUMENTS

| | | | |
|---|---|---|---|
| 7,716,275 B1 | 5/2010 | Nagaralu et al. | |
| 8,046,378 B1 | 10/2011 | Zhuge et al. | |
| 8,131,784 B1 | 3/2012 | Zhuge et al. | |
| 8,190,843 B1 | 5/2012 | De Forest et al. | |
| 8,515,904 B1 | 8/2013 | Dwyer, III et al. | |
| 8,892,507 B1 | 11/2014 | Dwyer, III et al. | |
| 8,924,364 B1 | 12/2014 | Zhong et al. | |
| 2006/0117135 A1 | 6/2006 | Thind et al. | |
| 2007/0233991 A1 | 10/2007 | Diao et al. | |
| 2013/0148668 A1 | 6/2013 | Kean et al. | |
| 2015/0363113 A1* | 12/2015 | Rahman ................ G06F 3/0673 707/718 |
| 2018/0196700 A1* | 7/2018 | Aronovich ............ G06F 3/0631 |
| 2019/0332370 A1* | 10/2019 | Christiansen ......... G06F 9/5016 |
| 2019/0370043 A1* | 12/2019 | Olderdissen ......... G06F 3/0673 |
| 2020/0044983 A1* | 2/2020 | Zheng ..................... H04L 67/32 |

\* cited by examiner

*Primary Examiner* — Edward J Dudek, Jr.
(74) *Attorney, Agent, or Firm* — Stratford Managers Corporation

(57) ABSTRACT

A system for memory management that comprises: a computing system having a finite amount of memory and a physical computer readable storage memory readable by a processing circuit and storing instructions for execution by the circuit to: set, by a memory coordinator, the urgency of each memory consumer; adjust, by the memory coordinator, the memory quota of each memory consumer—such that the sum of the memory quota of each memory consumer does not exceed the memory; and adjust, by each memory consumer, its memory usage in response to a quota input and an urgency input from the memory coordinator to the memory consumer. The memory is managed by a memory coordinator and memory consumers; and consumed by the memory consumers. Each memory consumer has: a memory quota, an urgency and a memory usage. Also, the urgency of each memory consumer increases as the sum of the memory usage of the plurality of memory consumers approaches the finite amount of memory.

20 Claims, 6 Drawing Sheets

CO-OPERATIVE MEMORY MANAGEMENT SYSTEM

BACKGROUND

A computer system has a finite amount of memory, which is often shared between a set of competing components that each consume part of the finite amount of memory. During the course of operation of the system, the memory usage of each component may fluctuate, with some components using increasing amounts of memory. There is a danger that, left uncontrolled, the total memory usage of the components will approach the limit of the finite amount of memory, to a point where one or more components can no longer function effectively because no more memory is available to be consumed.

BRIEF SUMMARY

According to one embodiment, a system for memory management, the system comprising: a computing system having a finite amount of memory, wherein the finite amount of memory is: managed by a memory coordinator and a plurality of memory consumers; and consumed by the plurality of memory consumers, each memory consumer having a memory quota, an urgency and a memory usage; and a physical computer readable storage memory readable by a processing circuit and storing instructions for execution by the processing circuit for performing a method, the method comprising: setting, by the memory coordinator, the urgency of each memory consumer; adjusting, by the memory coordinator, the memory quota of each memory consumer wherein a sum of the memory quota of each memory consumer does not exceed the finite amount of memory; and adjusting, by each memory consumer, its memory usage in response to a quota input and an urgency input from the memory coordinator to the memory consumer; wherein the urgency of each memory consumer increases as the sum of the memory usage of the plurality of memory consumers approaches the finite amount of memory.

According to another embodiment, a computer program product for memory management comprising: a computing system having a finite amount of memory, wherein the finite amount of memory is: managed by a memory coordinator and a plurality of memory consumers; and consumed by the plurality of memory consumers, each memory consumer having a memory quota, an urgency and a memory usage; and a physical computer readable storage memory readable by a processing circuit and storing instructions for execution by the processing circuit for performing a method comprising: setting, by the memory coordinator, the urgency of each memory consumer; balancing, by the memory coordinator, the memory quota of each memory consumer, wherein a sum of the memory usage of each memory consumer does not exceed the finite amount of memory; and adjusting, by each memory consumer, the memory usage of the memory consumer in response to a quota input and an urgency input from the memory coordinator to the memory consumer; wherein the urgency of each memory consumer increases as the sum of the memory usage of each memory consumer approaches the finite amount of memory.

In the system and computer program product, the method may further comprise: setting, by the memory coordinator, a first memory limit that is a fraction of the finite amount of memory, wherein a sum of the memory quotas of the plurality of memory consumers is less than the first memory limit. This first memory limit can be 80%-95% of the finite amount of memory. The method may further comprise: setting, by the memory coordinator, a second memory limit that is a fraction of the first memory limit, wherein the sum of the quotas is less than the second memory limit. This second memory limit can be 85%-90% of the first memory limit.

In the system and computer program product, the method may further comprise releasing, by the memory consumer, an amount of memory held by the memory consumer as the memory usage of the memory consumer approaches or exceeds the memory quota of the memory consumer. The amount of memory released by the memory consumer may depend on the urgency input from the memory coordinator.

In the system and computer program product, adjusting the memory quota of each memory consumer may further comprise: requesting, by the memory coordinator, the memory usage of each consumer; ranking, by the memory coordinator, each memory consumer based on a quota need and a memory release capability of each memory consumer; and rebalancing, by the memory coordinator, the quota of each memory consumer. The memory release capability can be based, in part, on: a) a difference between the memory usage and the quota; and b) rate of change of the difference over time.

In the system and computer program product, the method may further comprise releasing, by the memory consumer, an amount of memory held by the memory consumer without the quota input or the urgency input from the memory coordinator.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure relates generally to the field of computer memory management. The following described exemplary embodiments provide a system, program product and method to provide memory management coordinated between a memory coordinator and a plurality of memory consumers.

As will be appreciated by one skilled in the art, aspects of the present disclosure may be embodied as a system, computer program product or method. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
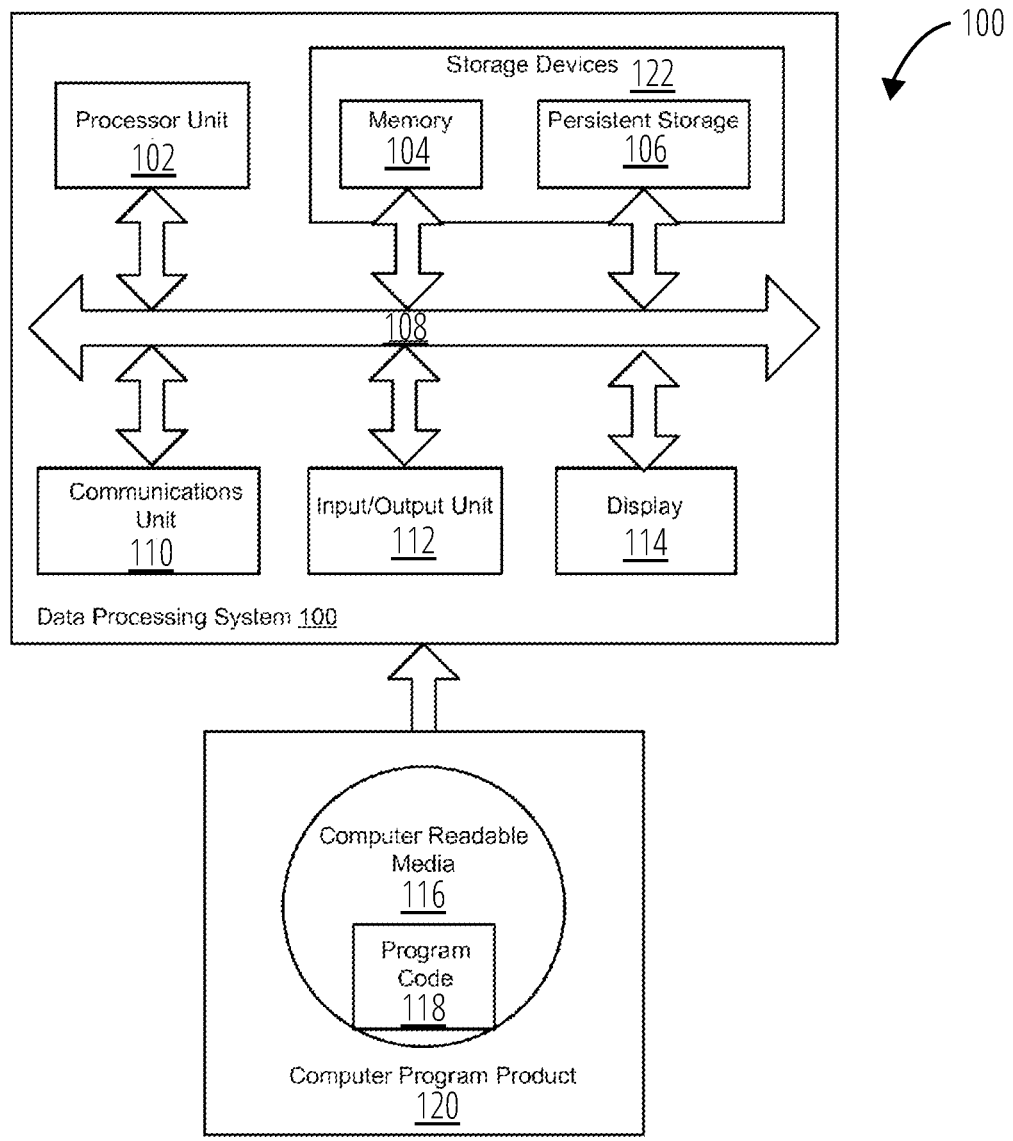
FIG. 1 illustrates a computing system 100 in accordance with one embodiment.

FIG. 1 illustrates a block diagram of a computing system 100 operable for various embodiments of the disclosure. In FIG. 1, computing system 100 includes a communications fabric 108 which enables communications between processor unit 102, Memory 104, persistent storage 106, Communications unit 110, input/output (I/O) unit 112, and Display 114.

In some embodiments, a bus system may be used to implement communications fabric 108 and may be comprised of one or more buses, such as a system bus or an input/output bus. The bus system may be implemented using any suitable type of architecture that provides for a transfer of data between different components or devices attached to the bus system. Additionally, a Communications unit 110 may include one or more devices used to transmit and receive data, such as a modem or a network adapter. Further, a memory may be, for example, Memory 104 or a cache such as found in an interface and memory controller hub that may be present in communications fabric 108.

The processor unit 102 executes instructions for software that may be loaded into Memory 104. Processor unit 102 may be a set of one or more processors or may be a multi-processor core. As an illustrative example, one or more heterogeneous processor systems may be implemented in processor unit 102, in which a main processor is present with secondary processors on a single chip. In another illustrative example, processor unit 102 may be a symmetric multi-processor system containing multiple processors of the same type.

Memory 104, may be, for example, a random access memory or any other suitable volatile or non-volatile storage device. Persistent storage 106 may contain one or more components or devices; it may be a flash memory, a hard drive, a rewritable magnetic tape, a rewritable optical disk, or some combination of the above. The media used by persistent storage 106 also may be removable. For example, a removable hard drive may be used for persistent storage 106.

A storage device is any piece of hardware that is capable of storing information. Examples of storage devices 122 include Memory 104 and persistent storage 106, as described above.

As another example, a storage device in computing system 100 may be any hardware apparatus that may store data. Memory 104, persistent storage 106 and Computer readable media 116 are examples of storage devices in a tangible form.

Communications unit 110 provides for communications with other systems or devices; it may provide communications through the use of physical and/or wireless communications links.

Input/Output unit 112 serves to allow for input and output of data using other devices that may be connected to computing system 100. In some embodiments, Input/Output unit 112 may provide a connection for user input through a mouse, a keyboard, and/or some other suitable input device. In addition, Input/Output unit 112 may send output to a printer, while Display 114 provides a way to display information to a user.

Computer-implemented instructions for the operating system, applications and/or programs may be located in storage devices 122, which are in communication with processor unit 102 via communications fabric 108. In some embodiments, the instructions are on persistent storage 106. These instructions may be loaded into Memory 104 for execution by processor unit 102. The processes of the different embodiments may be performed by processor unit 102 using computer-implemented instructions, which may be located in storage devices 122.

These instructions are referred to as program code, computer usable program code, or computer readable program code that may be read and executed by a processor in processor unit 102. The program code in the different embodiments may be embodied on different physical or tangible computer readable media, such as Memory 104 or persistent storage 106.

Program code 118 may be located in a functional form on Computer readable media 116 that may be removable and may be loaded onto or transferred to computing system 100 for execution by processor unit 102. Program code 118 and Computer readable media 116 form Computer Program Product 120 in these examples. In one example, Computer readable media 116 may be in a tangible form, such as, for example, an optical or magnetic disc that is inserted or placed into a drive or other device that is part of persistent storage 106 for transfer onto a storage device, such as a hard drive that is part of persistent storage 106. In a tangible form, Computer readable media 116 also may take the form of a persistent storage, such as a hard drive, a thumb drive, or a flash memory that is connected to computing system 100. The tangible form of Computer readable media 116 may also referred to as computer recordable storage media. In some instances, Computer readable media 116 may not be removable.

Alternatively, Program code 118 may be transferred to computing system 100 from Computer readable media 116 through a communications link to Communications unit 110 and/or through a connection to Input/Output unit 112. The communications link and/or the connection may be physical or wireless. The computer readable media also may take the form of non-tangible media, such as communications links or wireless transmissions containing the program code.

In some illustrative examples, Program code 118 may be downloaded over a network to persistent storage 106 from another device or data processing system for use within computing system 100.

The different components illustrated for computing system 100 are not meant to provide architectural limitations to the manner in which different embodiments may be implemented. The different illustrative embodiments may be implemented in a computing system 100 including components in addition to or in place of those illustrated for computing system 100. Other components shown in FIG. 1 can be varied from the illustrative examples shown. The different embodiments may be implemented using any hardware device or system capable of executing program code With reference to FIG. 2, a schematic representation of components of a co-operative memory management system 200, in accordance with various embodiments of the disclosure, is presented.

Co-operative memory management system 200 may be implemented in computing system 100 (shown in FIG. 1) for management of the finite amount of memory of computing system 100.

Co-operative memory management system 200 comprises a memory coordinator 202 and a plurality of memory consumers 204, 206 and 208. The finite amount of memory is managed by memory coordinator 202 and the plurality of memory consumers 204, 206 and 208. The finite amount of memory is consumed by the plurality of memory consumers 204, 206 and 208.

Each memory consumer 204, 206, 208 has a respective quota 210, 216, 222; memory usage 212, 218, 224; and urgency 214, 220, 226. For example, memory consumer 204 has a quota 210, memory usage 212 and urgency 214. The memory quota is the (theoretical) maximum allowable memory usage for the memory consumer. The urgency of each memory consumer indicates how aggressively the memory consumer must attempt to stay beneath its memory quota.

Figure 2:
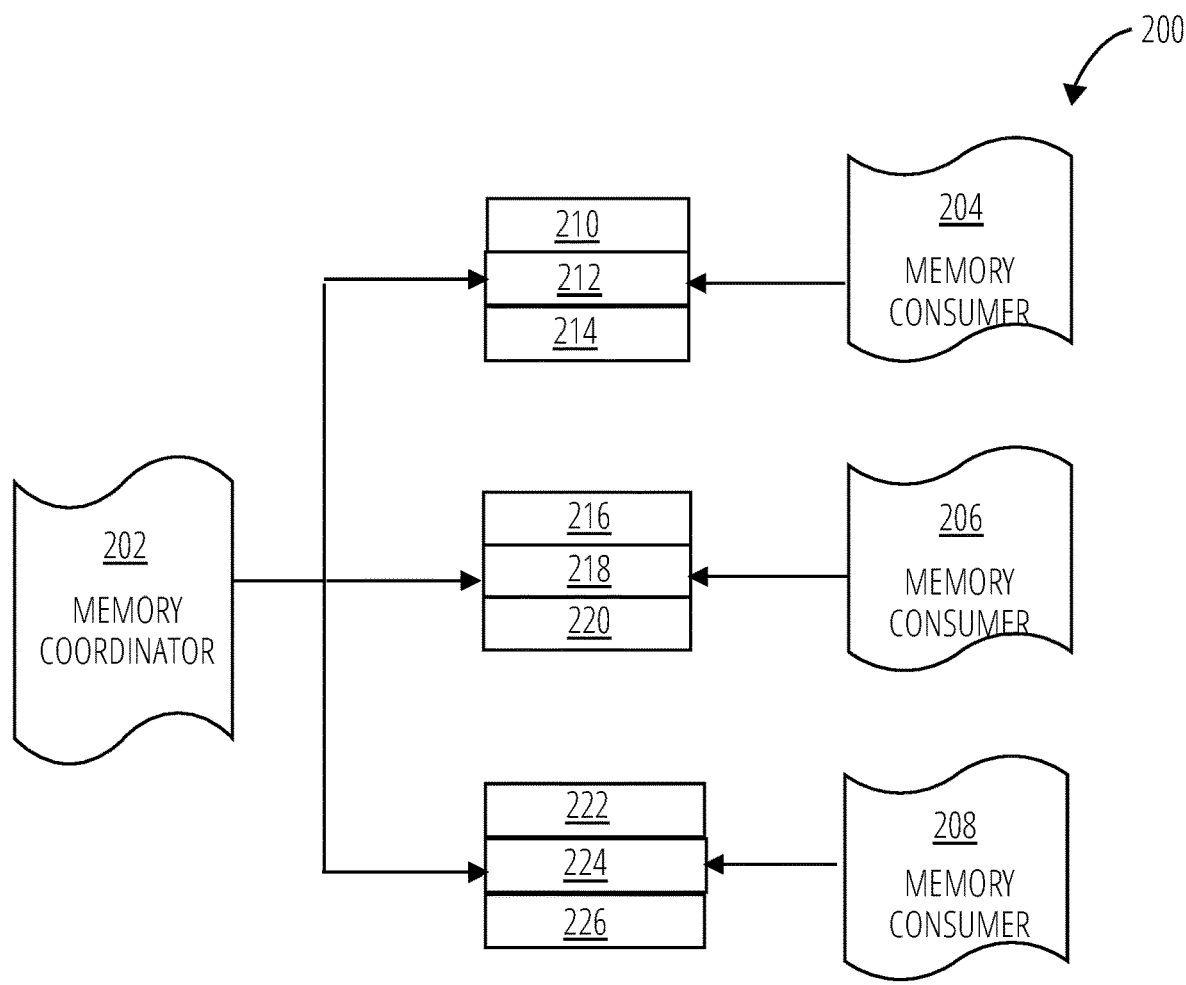
FIG. 2 illustrates a schematic representation of components of a co-operative memory management system, in accordance with various embodiments of the disclosure.

While three memory consumers 204, 206, 208 are shown in FIG. 2, it is understood that memory management system 200 may have fewer or more memory consumers, subject to the conditions described below.

For the overall process, memory coordinator 202 sets a first (or hard) memory limit and a second (or soft) memory limit, each of which provide a buffer towards approaching the finite amount of memory of the computing system by the various memory consumers 204, 206, 208.

The hard limit is a percentage of the finite amount of memory, such that the sum of the memory quotas 210, 216, 222 is less than the hard limit. The hard limit can be from 25%-95%, 80%-95%, or 85%-95% or 85%-90% of the finite amount of memory.

The soft limit is a percentage of the hard limit. The soft limit can be from 25%-95%, 80%-95%, or 85%-95% or 85%-90% of the hard limit. The memory coordinator 202 attempts to assign a memory quota 210, 216, 222 for each respective memory consumer 204, 206, 208 such that the sum of the memory quotas 210, 216, 222 falls beneath the soft limit. This arrangement provides some contingency for memory consumers that fail to respect their memory quotas.

Figure 3:
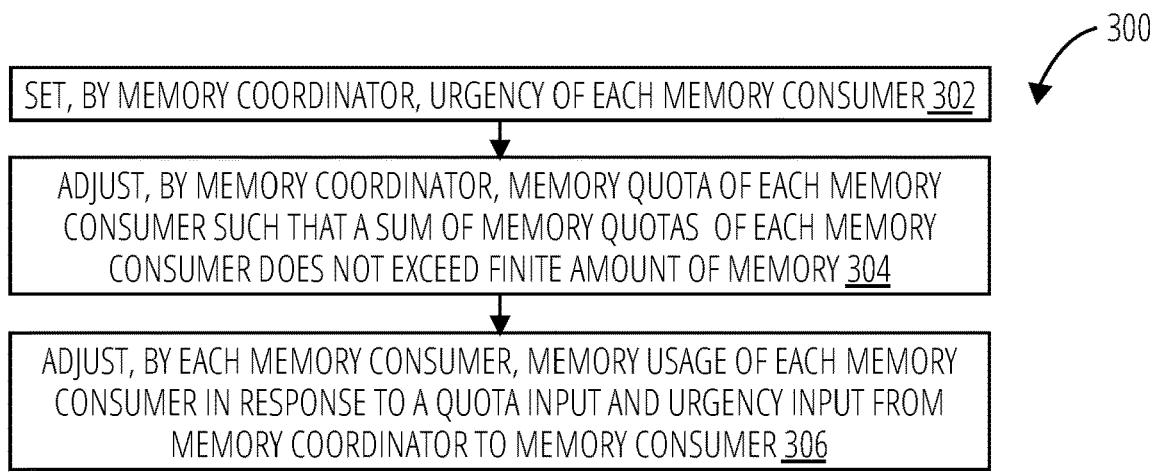
FIG. 3 illustrates an exemplary process for cooperative management of memory, in accordance with one embodiment of the disclosure.

With reference to FIG. 3, a cooperative memory management process 300, using the cooperative management system of FIG. 2, in accordance with one embodiment of the disclosure, is presented. The processing unit 102 (shown in FIG. 1) executes computer-readable instructions to execute the cooperative memory management process 300 shown in FIG. 3.

At 302, the memory coordinator sets the urgency of each memory consumer.

At 304, the memory coordinator adjusts the memory quota of each memory consumer, such that the sum of all of the memory quota does not exceed the finite amount of memory.

At 306, each memory consumer adjusts its memory usage, in response to quota and urgency directives from memory coordinator.

The urgency of each respective memory consumer increases as the sum of the memory usage of each respective memory consumer approaches the finite amount of memory.

Thus in one illustrative embodiment, a computer-implemented process manages the finite amount of memory of a computing system by cooperative memory management between a memory coordinator and a plurality of memory consumers. The computer-implemented process sets an urgency of each memory consumer, via the memory coordinator. The computer-implemented process then adjusts the memory quota of each memory consumer, via the memory coordinator, such that the sum of all memory quotas does not exceed the finite amount of memory. In response to the quota input and urgency input from the memory coordinator, each memory consumer adjusts its memory usage. The urgency of each memory consumer increases as the total memory usage (of all of the memory consumers) approaches the finite amount of memory of the computing system.

Figure 4:
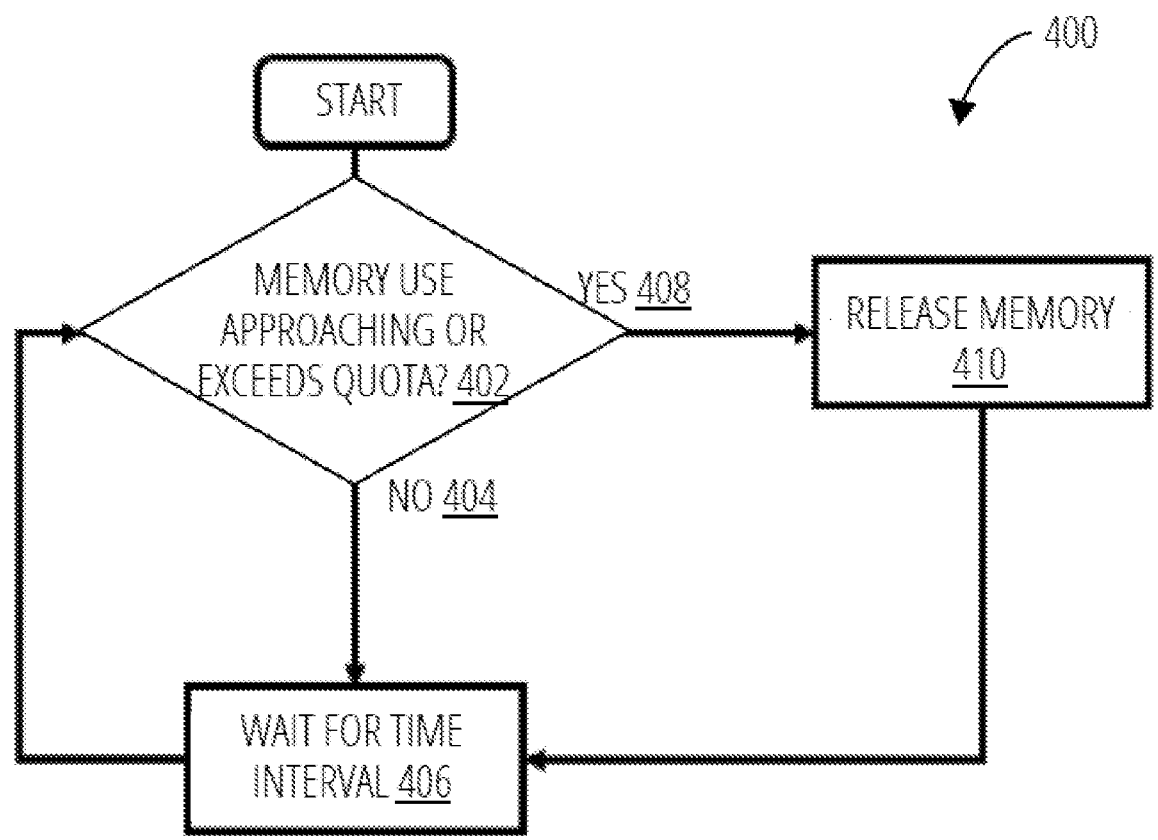
FIG. 4 illustrates an exemplary memory consumer process, in accordance with one embodiment of the disclosure.

With reference to FIG. 4, a memory consumer process 400, using the cooperative management system of FIG. 2, in accordance with one embodiment of the disclosure, is presented. The processing unit 102 (shown in FIG. 1) executes computer-readable instructions to execute the memory consumer process 400 process shown in FIG. 4, At 402, each memory consumer (shown in FIG. 2) periodically checks whether its memory is approaching or exceeds its memory quota (step 402).

At 410, it releases memory if its memory usage exceeds its memory quota, or approaches it.

Depending on its urgency (as set by the memory coordinator), the memory consumer releases memory more quickly or more slowly, as its usage approaches its quota.

If, on the other hand, memory usage does not exceed quota (step 404), then no memory is released and the system waits for the next time interval (step 406) to check if the memory use of the memory consumer exceeds memory quota.

Additionally, each memory consumer can pro-actively manage its memory usage (i.e. without input from the memory coordinator) even if its usage doesn't exceed its quota. For example, a memory consumer can release memory that is no longer needed.

Thus in one illustrative embodiment, a computer-implemented process provides a memory consumer process. For each memory consumer, the computer-implemented process periodically checks the memory use against memory quota. If the memory use is within the quota, then the computer-implemented process waits for a time interval to pass, to check the memory use versus the quota again. If, on the other hand, the memory use is approaching or exceeds quota, then the memory consumer releases memory.

Figure 5:
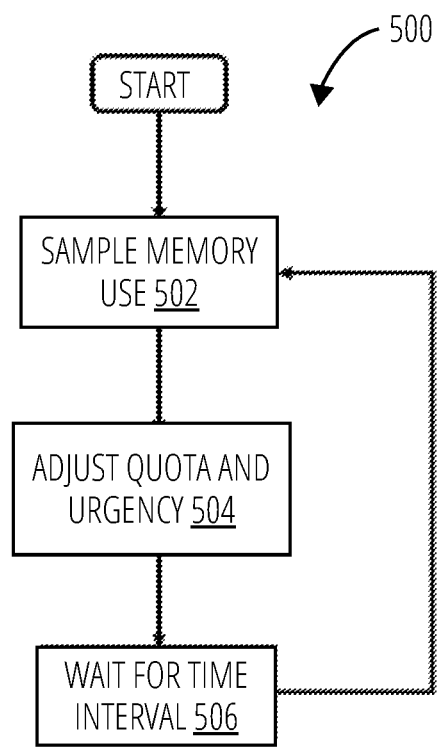
FIG. 5 illustrates an exemplary coordinator process, in accordance with one embodiment of the disclosure.

With reference to FIG. 5, a memory coordinator process 500, using the cooperative management system of FIG. 2, in accordance with one embodiment of the disclosure, is presented.

The processing unit 102 (shown in FIG. 1) executes computer-readable instructions to execute the memory coordinator process 500 shown in FIG. 5, in which the memory coordinator (shown in FIG. 2) supports a plurality of memory consumers. The memory coordinator balances the quota of each memory consumer to ensure that the total memory quota stays within the finite amount of memory of the computing system. The memory coordinator may set a condition wherein the total memory quota is within the hard memory limit or may set a condition wherein the total memory quota is within the soft memory limit.

At 502, the memory coordinator periodically samples the memory usage of each memory consumer by requesting the memory usage of each memory consumer.

At 504, the memory coordinator adjusts the quota and urgency of each memory consumer, based on the memory use and quota of each consumer. The memory coordinator rebalances the memory quota among the memory consumers.

At 506, the memory coordinator waits for a defined time interval, before repeating steps 502-506.

In addition, each memory consumer can have a memory release capability. That is, different memory consumers are more or less effective at releasing memory. Different memory consumers are able to respond to quota adjustments (from the memory coordinator) with different latencies. In some instances, it is possible that some memory consumers cannot respond at all to a quota adjustment sent by the memory coordinator. On the other hand, some memory consumers can release memory, but only in a user-disruptive manner.

The memory coordinator can consider the memory release capability of each memory consumer when deciding how to prioritize allocation of memory quota. As an example, the memory coordinator may choose to avoid lowering the memory quota for memory consumers that cannot release memory effectively, and instead, choose to lower the memory quota of those memory consumers that can release memory effectively.

In some embodiments, the memory coordinator infers the memory release capability of each memory consumer based on how well the memory consumer respects its quota. For example, the memory release capability may be inferred according to the rate at which the memory usage of a memory consumer exceeds its quota.

The step of adjusting the quota and urgency of each memory consumer may proceed in any number of ways. This may also include ranking each memory consumer by its quota need and memory release capability. In some embodiments, the urgency of each consumer may be based on a first difference D1 and/or a second difference D2:

D1=hard memory limit—sum of all memory usage by memory consumers,

D2=soft memory limit—sum of all memory usage by memory consumers.

In addition, the memory coordinator can rank each memory consumer in terms of its memory release capability. The rank of each memory consumer can be based on the following:

QuotaDelta=(memory use—quota), which indicates whether a consumer is above or below its quota;

QuotaDeltaRate=change in QuotaDelta over time which indicates how well the memory consumer has been tracking its memory use in relation to its quota; and InUseRate=change in memory use over time, which indicates whether the memory usage of a memory consumer is growing or shrinking over time.

The memory release capability of each memory consumer is partly reflected by its QuotaDeltaRate. The joint condition QuotaDelta>0 and QuotaDeltaRate>0 indicates that the memory consumer cannot maintain its memory use below its quota. Such a memory consumer would thus not be ranked high.

Thus in one illustrative embodiment, a computer-implemented process provides a memory coordinator process in which a memory coordinator periodically samples memory use of each memory consumer and subsequently adjusts the memory quota and urgency of each memory consumer. The adjustment may depend on trends in the memory use of each memory consumer.

Figure 6:
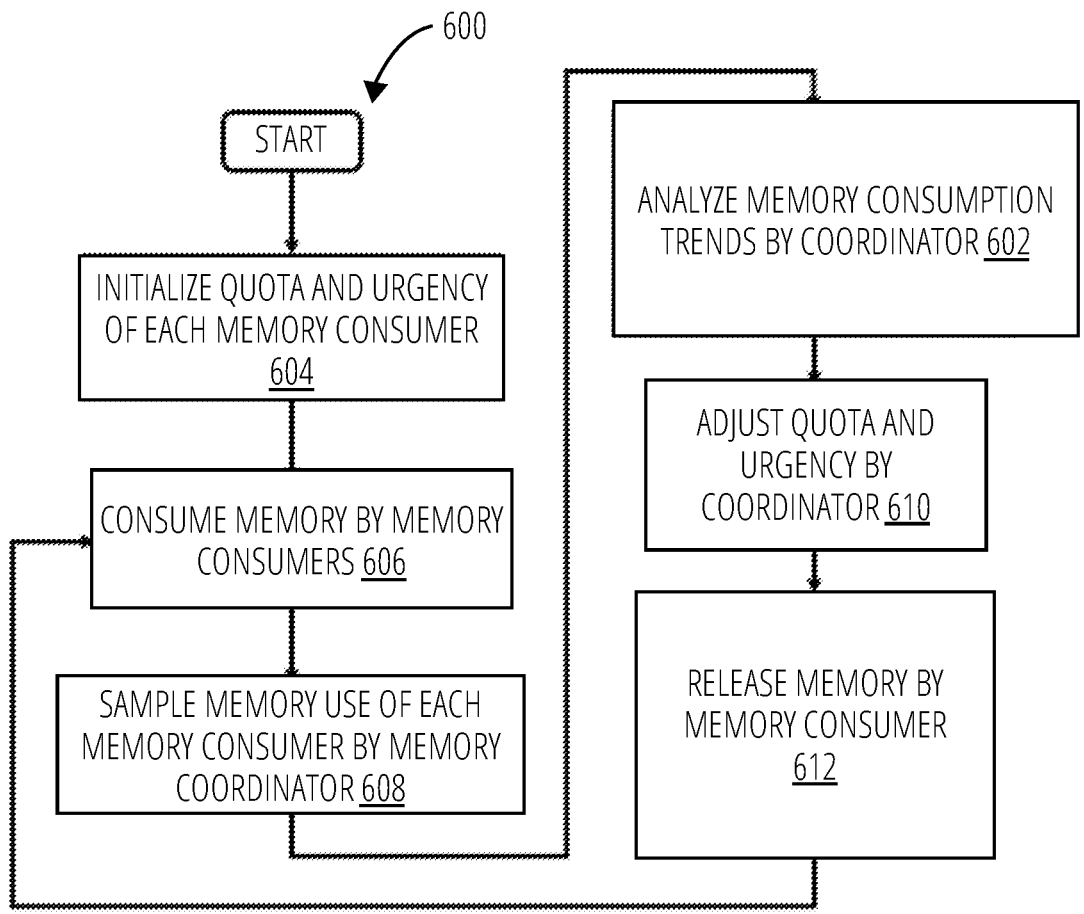
FIG. 6 illustrates an exemplary process for cooperative management of memory, in accordance with one embodiment of the disclosure.

With reference to FIG. 6, a cooperative memory management process 600, using the cooperative management system of FIG. 2, in accordance with one embodiment of the disclosure, is presented.

The processing unit 102 (shown in FIG. 1) executes computer-readable instructions to execute the cooperative memory management process 600 shown in FIG. 6, in which the memory coordinator (shown in FIG. 2) supports a plurality of memory consumers.

At 604, the memory coordinator initializes the quota and urgency of each memory consumer (in a plurality of memory consumers).

At 606, each memory consumer consumes a portion of the finite memory of the computing system.

At 608, the memory coordinator samples the memory use of each of the memory consumers periodically.

At 602, the memory coordinator analyzes memory use trends of each memory consumer, along with the relation between the memory use (of each memory consumer), the memory quota (of each memory consumer) and the amount of finite memory of the computing system. Examples of trend parameters have been discussed above.

At 610, the memory coordinator adjusts the memory quota and urgency of each of the memory consumers following the analysis at step 602. This rebalancing is meant to keep the total memory use below the finite amount of memory of the computing system. The cooperative memory management process can have additional restrictions to provide a buffer between the total memory use and the finite amount of memory of the computing system. For example, the memory coordinator can adjust the memory quota of each memory consumer such that the total memory quota is less than the hard memory limit, or less than the soft memory limit.

At 612, each memory consumer releases some of its memory when it is no longer needed, or when its memory use approaches or exceeds its memory quota. The process then resumes at step 606.

Thus in one illustrative embodiment, a computer-implemented process provides a cooperative memory management process in which a memory coordinator manages a plurality of memory consumers. The memory coordinator initializes the quota and urgency of each memory consumer; each memory consumer consumes a portion of the finite memory of the computing system. At defined time intervals, the memory coordinator samples the memory use of each memory consumer and subsequently analyzes memory use trends of each memory consumer, along with the relation between the memory use (of each memory consumer), the memory quota (of each memory consumer) and the amount of finite memory of the computing system. Following this analysis, the memory coordinator adjusts the memory quota and urgency of each of the memory consumers so as to keep the total memory use below the finite amount of memory of the computing system. In response to this adjustment, one or more of the memory consumers may release memory.

Non-Limiting Example

Urgency Level:

In a non-limiting example of a system of cooperative memory management, there are a multiplicity of urgency levels. For example, the urgency levels are designated as: BELOW_LIMIT (lowest urgency), NEAR_LIMIT, and OVER_LIMIT (highest urgency).

Memory Consumer:

An example memory consumer caches the results of various expensive calculations. The cached calculated results are ranked by order of importance. The results can be recalculated; these are cached to improve performance.

The memory consumer's memory usage is the size of memory used to save the cached calculated results.

When the memory consumer's quota is set below the size of its memory usage:

a) If its urgency is BELOW_LIMIT, then the memory consumer does not release memory.

b) Else if its urgency is NEAR_LIMIT or OVER_LIMIT, the memory consumer deletes cached calculated results, starting with the least important, until its memory usage is less than the quota or there are no more cached calculated results.

Cached calculated results can also become invalid when the input to a calculation changes. Invalid results are useless. The memory consumer proactively deletes invalid cached calculated results, regardless of its urgency, and regardless of whether its memory usage is above or below quota.

Memory Coordinator:

An example of a simplified production algorithm is shown below.

1. The memory consumer iterates through all the memory consumers. For each memory consumer, it collects its memory usage and the current timestamp.

2. For each memory consumer, calculates QuotaDelta, QuotaDeltaRate, InUseRate.

3. Ranks the consumers based on Score.

a. Score is a function of the discriminant tuple (Discriminant(QuotaDelta), Discriminant(QuotaDeltaRate), Discriminant(InUseRate)).

b. Discriminant(x)=NEGATIVE if x<0, POSITIVE if x>0, ZERO if x=0 c. Score is the position in this list of the discriminant tuple: (top of the list=high score, bottom of the list=low score) {// {quotaDelta, inUseRate, quotaDeltaRate}
{POSITIVE, POSITIVE, POSITIVE},
{POSITIVE, POSITIVE, ZERO},
{POSITIVE, POSITIVE, NEGATIVE},
{POSITIVE, ZERO, POSITIVE},
{POSITIVE, ZERO, ZERO},
{POSITIVE, ZERO, NEGATIVE},
{POSITIVE, NEGATIVE, POSITIVE},
{POSITIVE, NEGATIVE, ZERO},
{POSITIVE, NEGATIVE, NEGATIVE},
// Scores below don't qualify for quota RAISE
{ZERO, POSITIVE, POSITIVE},
{ZERO, POSITIVE, ZERO},
{ZERO, POSITIVE, NEGATIVE},
{ZERO, ZERO, NEGATIVE}, // quota is decreasing but usage isn't changing
{ZERO, ZERO, ZERO}, // quota and usage are balanced perfectly
{ZERO, ZERO, POSITIVE}, // quota is increasing but usage isn't changing
{ZERO, NEGATIVE, POSITIVE},
{ZERO, NEGATIVE, ZERO},
{ZERO, NEGATIVE, NEGATIVE},
// Scores above qualify for quota LOWERING only when there is urgency
{NEGATIVE, POSITIVE, NEGATIVE}, // InUse is getting closer to quota
{NEGATIVE, POSITIVE, ZERO},
{NEGATIVE, POSITIVE, POSITIVE},
{NEGATIVE, ZERO, NEGATIVE},
{NEGATIVE, ZERO, ZERO},
{NEGATIVE, ZERO, POSITIVE},
{NEGATIVE, NEGATIVE, NEGATIVE}, // quota is dropping faster than InUse
{NEGATIVE, NEGATIVE, ZERO},
{NEGATIVE, NEGATIVE, POSITIVE} // InUse is dropping faster than quota}

4. Calculates the total memory usage of all the memory consumers.

5. Calculates the urgency for each memory consumer.

6. Calculates the quota increment step and decrement step, which are percentages of the soft memory limit. When urgency is UNDER LIMIT, the increment percentage is large and the decrement percentage is small. The increment percentage is decreased when urgency increases. The decrement percentage is increased when urgency increases.

7. Raises consumer quotas by the increment step, in ranked order, while total quota is below the soft limit, some consumers have usage above quota, and we can find consumers to steal quota from. We steal quota from consumers whose Score is (NEGATIVE, POSITIVE, NEGATIVE) or below (towards the bottom of the list).

8. Lowers consumer quotas by the decrement step, in reverse ranked order, until the total quota is below the hard limit.

There are innumerable variations of the memory coordinator process. For example:

Score can be calculated differently by considering fewer factors, more factors, or different factors.

memory consumers can provide characteristics to the memory coordinator, which cause the coordinator to adjust its quota differently. For example, some memory consumers cannot release memory when asked, so the memory coordinator sets their quotas to their usage.

Instead of distributing quota increments/decrements in fixed steps, the increment/decrement could be calculated as a function of quotaDelta or other factors.

Instead of distributing quota increments evenly across all consumers, we could try to increase the quota of the highest-scoring consumer above usage before considering the quota of the next highest-scoring consumer.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A system for memory management, the system comprising:
   a computing system having a finite amount of memory, wherein the finite amount of memory is: managed by a memory coordinator and a plurality of memory consumers; and consumed by the plurality of memory consumers, each memory consumer having a memory quota, an urgency and a memory usage; and
   a physical computer readable storage memory readable by a processing circuit and storing instructions for execution by the processing circuit for performing a method, the method comprising:
   setting, by the memory coordinator, the urgency of each memory consumer;
   adjusting, by the memory coordinator, the memory quota of each memory consumer wherein a sum of the memory quota of each memory consumer does not exceed the finite amount of memory; and
   adjusting, by each memory consumer, its memory usage in response to a quota input and an urgency input from the memory coordinator to the memory consumer;
   wherein the urgency of each memory consumer increases as the sum of the memory usage of the plurality of memory consumers approaches the finite amount of memory.

2. The system of claim 1, wherein the method further comprises: setting, by the memory coordinator, a first memory limit that is a fraction of the finite amount of memory, wherein a sum of the memory quotas is less than the first memory limit.

3. The system of claim 2, wherein the first memory limit is 80%-95% of the finite amount of memory.

4. The system of claim 2, wherein the method further comprises:
   setting, by the memory coordinator, a second memory limit that is a fraction of the first memory limit, wherein the sum of the quotas is less than the second memory limit.

5. The system of claim 4, wherein the second memory limit is 85%-90% of the first memory limit.

6. The system of claim 1, wherein the method further comprises releasing, by the memory consumer, an amount of memory held by the memory consumer as the memory usage of the memory consumer approaches or exceeds the memory quota of the memory consumer.

7. The system of claim 6, wherein the amount of memory released by the memory consumer depends on the urgency input from the memory coordinator.

8. The system of claim 1, wherein adjusting the memory quota of each memory consumer further comprises:
   requesting, by the memory coordinator, the memory usage of each consumer;
   ranking, by the memory coordinator, each memory consumer based on a quota need and a memory release capability of each memory consumer; and
   rebalancing, by the memory coordinator, the quota of each memory consumer.

9. The system of claim 8, wherein the memory release capability is based, in part, on: a) a difference between the memory usage and the quota; b) rate of change of the difference over time; and c) rate of change in the memory usage over time.

10. The system of claim 1, wherein the method further comprises releasing, by the memory consumer, an amount of memory held by the memory consumer without the quota input or the urgency input from the memory coordinator.

11. A computer program product for memory management comprising:
    a computing system having a finite amount of memory, wherein the finite amount of memory is: managed by a memory coordinator and a plurality of memory consumers; and consumed by the plurality of memory consumers, each memory consumer having a memory quota, an urgency and a memory usage; and
    a physical computer readable storage memory readable by a processing circuit and storing instructions for execution by the processing circuit for performing a method comprising:
    setting, by the memory coordinator, the urgency of each memory consumer;
    balancing, by the memory coordinator, the memory quota of each memory consumer wherein a sum of the memory usage of each memory consumer does not exceed the finite amount of memory; and
    adjusting, by each memory consumer, the memory usage of the memory consumer in response to a quota input and an urgency input from the memory coordinator to the memory consumer;
    wherein the urgency of each memory consumer increases as the sum of the memory usage of each memory consumer approaches the finite amount of memory.

12. The computer program product of claim 11, wherein the method further comprises:
    setting, by the memory coordinator, a first memory limit that is a fraction of the finite amount of memory, wherein a sum of the memory quotas is less than the first memory limit.

13. The computer program product of claim 12, wherein the first memory limit is 80%-95% of the finite amount of memory.

14. The computer program product of claim 12, wherein the method further comprises:
    setting, by the memory coordinator, a second memory limit that is a fraction of the first memory limit, wherein the sum of the quotas is less than the second memory limit.

15. The computer program product of claim 14, wherein the second memory limit is 85%-90% of the first memory limit.

16. The computer program product of claim 11, wherein the method further comprises releasing, by the memory consumer, an amount of memory held by the memory consumer as the memory usage of the memory consumer approaches or exceeds the memory quota of the memory consumer.

17. The computer program product of claim 16, wherein the memory released by the memory consumer depends on the urgency input from the memory coordinator.

18. The computer program product of claim 11, wherein balancing the memory quota of each memory consumer further comprises:
    requesting, by the memory coordinator, the memory usage of each consumer;
    ranking, by the memory coordinator, each memory consumer based on a quota need and a memory release capability of each memory consumer; and
    rebalancing, by the memory coordinator, the quota of each memory consumer.

19. The computer program product of claim 18, wherein the a memory release capability depends partly on: a) a difference between the memory usage and the quota; b) rate of change of the difference over time; and c) rate of change in the memory usage over time.

20. The computer program product of claim 11, wherein the method further comprises releasing, by the memory consumer, an amount of memory held by the memory consumer, without the quota input or the urgency input from the memory coordinator.

* * * * *

UNITED STATES PATENT AND TRADEMARK OFFICE
CERTIFICATE OF CORRECTION

| | |
|---|---|
| PATENT NO. | : 10,776,260 B1 |
| APPLICATION NO. | : 16/412668 |
| DATED | : September 15, 2020 |
| INVENTOR(S) | : Lin et al. |

It is certified that error appears in the above-identified patent and that said Letters Patent is hereby corrected as shown below:

On the Title Page

Item (12) "Lin" should read --Lin et al.--.

Item (72) Inventors, should read:
--(72) Inventors: Angela Lin, Kanata (CA); Robert Walker, Ottawa (CA); Marin Creanga, Ottawa (CA); Dylan Ellicott, Ottawa (CA); Alex Fitzpatrick, Ottawa (CA);--.

Signed and Sealed this
Twentieth Day of September, 2022

Katherine Kelly Vidal
*Director of the United States Patent and Trademark Office*